(12) United States Patent
Lee et al.

(10) Patent No.: US 11,784,676 B2
(45) Date of Patent: Oct. 10, 2023

(54) METHOD OF SWITCHING RECEIVING PATH AND ELECTRONIC DEVICE THEREFOR

(71) Applicant: SAMSUNG ELECTRONICS CO., LTD., Suwon-si (KR)

(72) Inventors: Youngmin Lee, Suwon-si (KR); Woojin Kim, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/709,854

(22) Filed: Mar. 31, 2022

(65) Prior Publication Data

US 2022/0321162 A1  Oct. 6, 2022

Related U.S. Application Data

(63) Continuation of application No. PCT/KR2022/004572, filed on Mar. 31, 2022.

(30) Foreign Application Priority Data

Mar. 31, 2021 (KR) .................. 10-2021-0042054

(51) Int. Cl.
*H04B 1/401* (2015.01)
*H04W 52/02* (2009.01)

(52) U.S. Cl.
CPC ........ *H04B 1/401* (2013.01); *H04W 52/0209* (2013.01)

(58) Field of Classification Search
CPC . H04B 1/401; H04W 52/0209; H04W 52/028
See application file for complete search history.

(56) References Cited

U.S. PATENT DOCUMENTS

| | | | |
|---|---|---|---|
| 8,427,982 | B2 | 4/2013 | Lee et al. |
| 8,514,008 | B2 | 8/2013 | Yan et al. |
| 9,106,733 | B2 | 8/2015 | Sanchez et al. |
| 10,333,567 | B1 | 6/2019 | Luo et al. |
| 10,432,240 | B1 | 10/2019 | Luo et al. |
| 10,498,521 | B2 | 12/2019 | Little |

(Continued)

FOREIGN PATENT DOCUMENTS

| | | |
|---|---|---|
| KR | 10-2009-0083104 | 8/2009 |
| KR | 10-2013-0041991 | 4/2013 |
| KR | 10-2020-0144902 | 12/2020 |

OTHER PUBLICATIONS

US 10,938,426 B2, 03/2021, Luo et al. (withdrawn)

(Continued)

*Primary Examiner* — Nguyen T Vo
(74) *Attorney, Agent, or Firm* — Nixon & Vanderhye, P.C.

(57) ABSTRACT

Disclosed is an electronic device including a plurality of antennas, a plurality of radio frequency circuits, a first transceiver, a second transceiver, a switching circuit configured to connect the plurality of radio frequency circuits to the first transceiver or the second transceiver, a processor, and a memory. The electronic device may be configured to switch a receiving path by connecting at least one of a plurality of receiving paths to another transceiver based on reception performance of the plurality of receiving paths.

20 Claims, 10 Drawing Sheets

(56) References Cited

U.S. PATENT DOCUMENTS

| | | |
|---|---|---|
| 11,095,349 B2 | 8/2021 | Cho |
| 11,159,188 B2 | 10/2021 | Luo et al. |
| 2008/0238807 A1* | 10/2008 | Ibrahim .................. H04B 7/04 |
| | | 343/876 |
| 2009/0190563 A1 | 7/2009 | Lee et al. |
| 2014/0170990 A1* | 6/2014 | Black ..................... H04B 1/401 |
| | | 455/73 |
| 2014/0187284 A1* | 7/2014 | Sanchez ............... H04B 1/0057 |
| | | 455/550.1 |
| 2015/0110229 A1* | 4/2015 | Kim .................. H04L 25/03821 |
| | | 375/347 |
| 2018/0131501 A1 | 5/2018 | Little |
| 2019/0305831 A1 | 10/2019 | Freisleben et al. |
| 2019/0363743 A1 | 11/2019 | Luo et al. |
| 2020/0280354 A1 | 9/2020 | Kulkarni et al. |
| 2020/0403671 A1 | 12/2020 | Cho |
| 2021/0159928 A1 | 5/2021 | Luo et al. |
| 2021/0384950 A1 | 12/2021 | Cho |

OTHER PUBLICATIONS

Search Report and Written Opinion dated Jul. 21, 2022 in counterpart International Patent Application No. PCT/KR2022/004572.

* cited by examiner

METHOD OF SWITCHING RECEIVING PATH AND ELECTRONIC DEVICE THEREFOR

CROSS-REFERENCE TO RELATED APPLICATIONS

This application is a continuation of International Application No. PCT/KR2022/004572 designating the United States, filed on Mar. 31, 2022, in the Korean Intellectual Property Receiving Office and claiming priority to Korean Patent Application No. 10-2021-0042054, filed on Mar. 31, 2021, in the Korean Intellectual Property Office, the disclosures of which are incorporated by reference herein in their entireties.

BACKGROUND

Field

The disclosure relates to a method of switching a receiving path and an electronic device therefor.

Description of Related Art

As the number of wireless electronic devices such as mobile phones increases, the demand for wireless traffic increases. Various wireless communication technologies are used to satisfy the increasing demand for wireless traffic. For example, 5th generation mobile communication is intended to increase a data transmission rate using mmWave and partial frequency bands (e.g., 3 GHz to 5 GHz) for 4th generation mobile communication. With an increase in a frequency band of a carrier wave, for example, in order to increase the data transmission rate, a technique such as multiple-input and multiple-output (MIMO) may be used. For example, data transmitted using multiple antennas of a base station may be received by an electronic device using multiple antennas to thereby increase the data transmission rate.

In order to support MIMO, an electronic device may include a transceiver having a plurality of receiving ports. The plurality of receiving ports may be connected to different antennas. Furthermore, in the transceiver, the plurality of receiving ports may be connected to different receiving paths. Each of the receiving paths may have an amplifier (e.g., low noise amplifier (LNA)) for amplifying a signal. The electronic device may control a gain of the amplifier based on reception power of a signal via each of the receiving paths.

An influence from a leakage signal may increase between receiving paths due to a small size of the transceiver and an increase of a frequency. For example, one receiving path may be affected by a leakage signal from neighboring receiving paths. Due to the influence of the leakage signal from neighboring receiving paths, control of the amplifier for the corresponding receiving path may be affected. Due to the leakage current, the reception power observed in the corresponding receiving path may be higher than the reception power of a signal actually received by the electronic device via a particular receiving path. In this case, the electronic device may set a gain value of the amplifier of the corresponding receiving path based on the reception power observed in the corresponding receiving path. For example, the electronic device may increase the gain value of the amplifier of the corresponding receiving path as the observed reception power decreases. When the reception power increases due to the leakage signal, the reception power of an actually desired signal may be lower than the observed reception power. When the electronic device sets the gain value according to the reception power, the actually desired received signal may not be sufficiently amplified due to the leakage signal. Since the desired received signal is not sufficiently amplified, a signal-to-noise ratio (SNR) associated with the corresponding receiving path may decrease. This may cause a decrease in data throughput associated with the corresponding receiving path.

SUMMARY

Embodiments of the disclosure may provide an electronic device and a method for addressing the above-described problems.

An electronic device according to an example embodiment of the disclosure may include: a plurality of antennas, a plurality of radio frequency circuits respectively connected to the plurality of antennas, a first transceiver, a second transceiver, a switching circuit configured to connect the plurality of radio frequency circuits to the first transceiver or the second transceiver, a processor, and a memory, wherein the memory stores instructions that, when executed by the processor, may cause the electronic device to: form at least one transmitting path and a plurality of first receiving paths by connecting the plurality of radio frequency circuits to the first transceiver using the switching circuit, receive data through the plurality of first receiving paths, and switch at least one of the plurality of first receiving paths by connecting at least one of the plurality of radio frequency circuitries to the second transceiver using the switching circuit based on reception performance associated with the plurality of first receiving paths.

A method for receiving data by an electronic device comprising a plurality of antennas according to an example embodiment of the disclosure may include: forming at least one transmitting path and a plurality of first receiving paths by connecting a plurality of radio frequency circuits respectively connected to the plurality of antennas to a first transceiver of the electronic device, receiving data through the plurality of first receiving paths, and switching at least one of the plurality of first receiving paths by connecting at least one of the plurality of radio frequency circuits to a second transceiver of the electronic device based on reception performance associated with the plurality of first receiving paths.

An electronic device according to various example embodiments of the disclosure may improve reception performance.

An electronic device according to various example embodiments of the disclosure may reduce an effect of a leakage signal by switching a transmitting path and/or receiving path based on reception performance.

Besides, various effects may be provided that are directly or indirectly identified through the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments of the disclosure will be described in greater detail with reference to the accompanying drawings. However, it should be understood that the disclosure is not limited to specific embodiments, but rather includes various modifications, equivalents and/or alternatives of various example embodiments of the disclosure.

Figure 1:
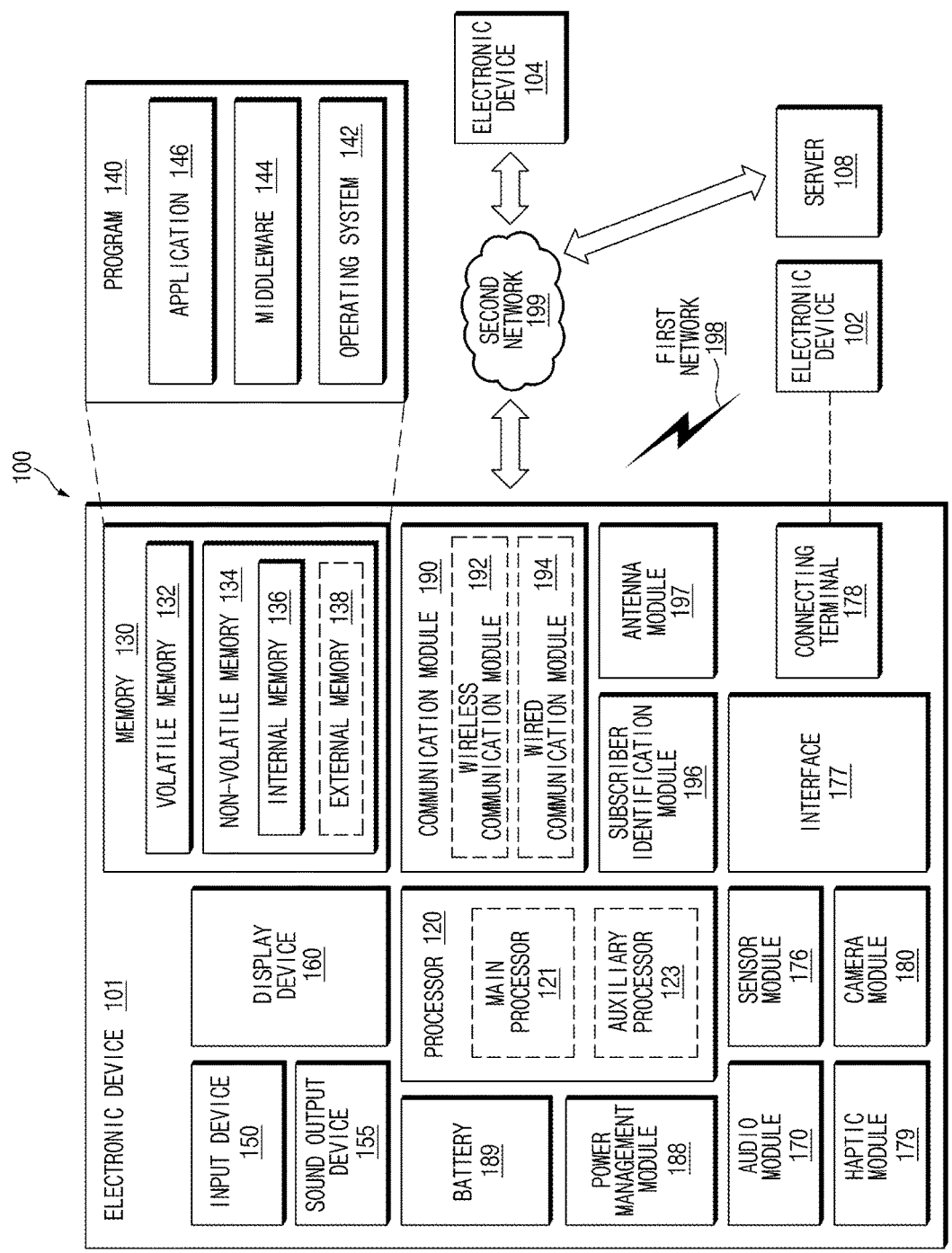
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
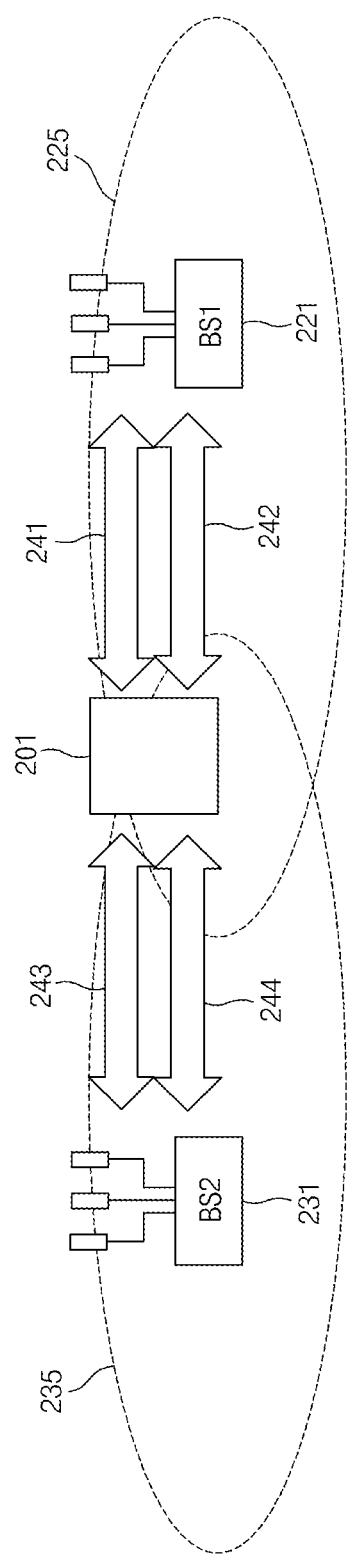
FIG. 2 is a diagram illustrating an example communication environment of an electronic device according to various embodiments.

FIG. 2 is a diagram illustrating an example communication environment of an electronic device according to various embodiments.

According to an embodiment, an electronic device 201 (e.g., the electronic device 101 of FIG. 1) may be configured to receive multiple data streams. For example, the electronic device 201 may support multiple input and multiple output (MIMO), carrier aggregation (CA), coordinated multi-point (CoMP), and/or multi-radio access technology (RAT) dual connectivity (MR-DC), etc. The electronic device 201 may include a plurality of antennas, and may receive a plurality of data streams using the plurality of antennas. Each of the first base station 221 and a second base station 231 may support 3rd generation, 4th generation, and/or 5th generation mobile communication.

For example, the electronic device 201 may be associated with a first cell 225 of the first base station 221, and may receive multiple data streams from the first base station 221. The electronic device 201 may receive a first data stream 241 and a second data stream 242. The electronic device 201 may receive the first data stream 241 and the second data stream 242 through the same frequency band. Although FIG. 2 illustrates two data streams, embodiments of the disclosure are not limited thereto. Similarly, the electronic device 201 may receive multiple data streams from the second base station 231.

For example, the electronic device 201 may be associated with the first cell 225 of the first base station 221 and a second cell 235 of the second base station 231. The electronic device 201 may receive at least one data stream (e.g., the first data stream 241 and/or the second data stream 242) from the first base station and at least one data stream (e.g., a third data stream 243 and/or a fourth data stream 244) from the second base station 231. For example, a frequency band associated with the first data stream 241 and a frequency band associated with the third data stream 243 may differ from each other.

For example, the electronic device 201 may support MR-DC. The electronic device 201 may receive the first data stream 241 from the first base station 221 based on 4th generation mobile communication and may receive the third data stream 243 from the second base station 231 based on 5th generation mobile communication.

The various examples described above with reference to FIG. 2 are examples of reception of multiple data streams by the electronic device 201, and embodiments of the disclosure are not limited thereto.

Figure 3:
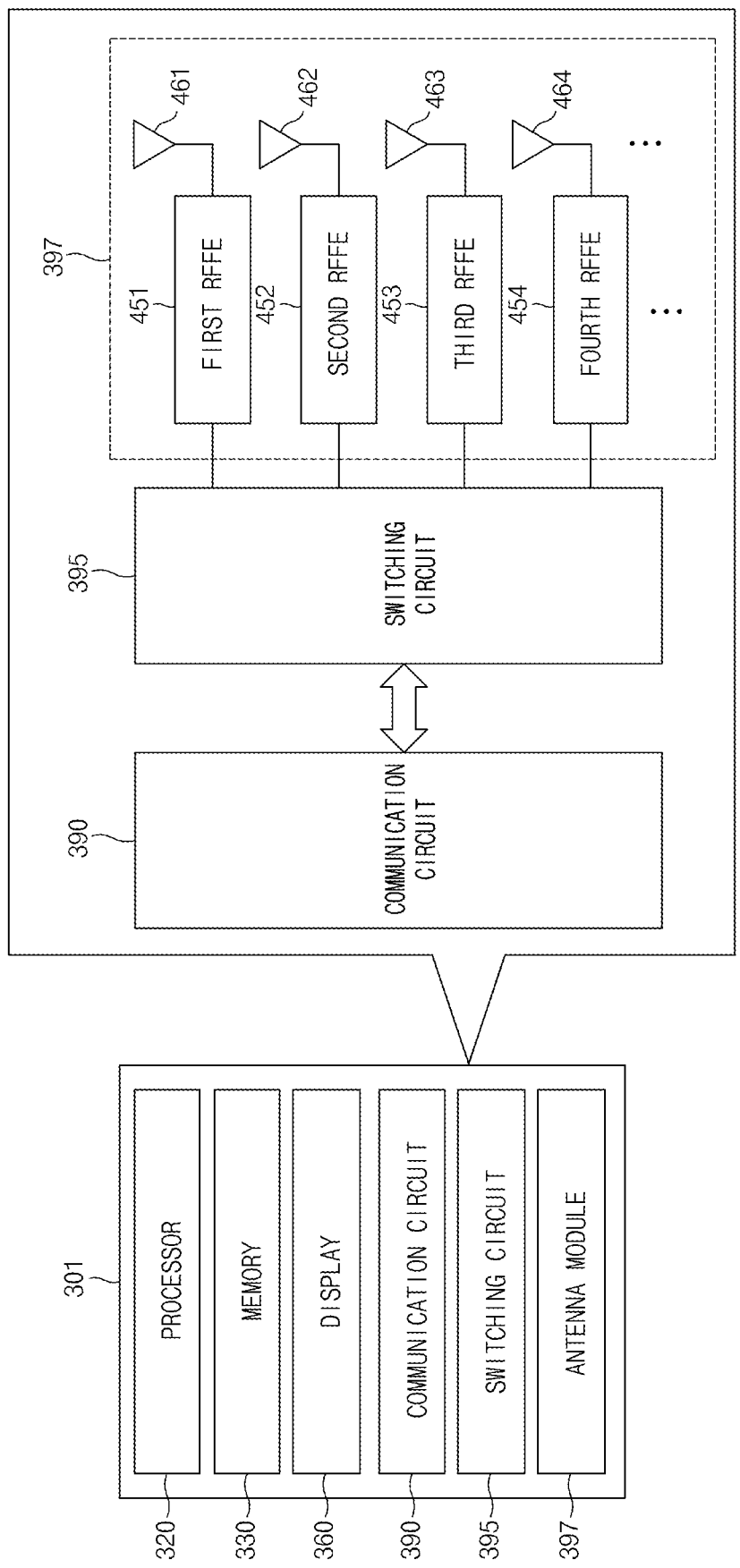
FIG. 3 is a block diagram illustrating an example configuration of an electronic device according to various embodiments.

FIG. 3 is a block diagram illustrating an example configuration of an electronic device according to various embodiments.

According to an embodiment, an electronic device 301 (e.g., the electronic device 201 of FIG. 2) may include a processor (e.g., including processing circuitry) 320 (e.g., the processor 120 of FIG. 1), a memory 330 (e.g., the memory 130 of FIG. 1), a display 360 (e.g., the display module 160 of FIG. 1), a communication circuit 390 (e.g., the communication module 190 of FIG. 1), a switching circuit 395, and/or an antenna module (e.g., including at least one antenna) 397 (e.g., the antenna module 197 of FIG. 1). The processor 320 may be operatively connected to the memory 330, the display 360, the communication circuit 390, the switching circuit 395, and/or the antenna module 397. The memory 330 may store one or more instructions that, when executed, cause the processor 320 to perform various operations of the electronic device 301.

The communication circuit 390 may include at least one transceiver. For example, the communication circuit 390 may include at least one transceiver that supports cellular mobile communication (e.g., 3rd generation, 4th generation, and/or 5th generation). The communication circuit 390 may include at least one transmitting port and a plurality of receiving ports.

The antenna module 397 may include a plurality of antennas and a plurality of radio frequency front end (RFFE) circuits. Each of the plurality of antennas may be formed as at least one radiator. For example, at least a portion of the plurality of antennas may include a portion (e.g., a portion of a side member) of a housing of the electronic device 301, a metallic pattern, a metallic radiator, and/or a conductive member. An RFEE may be referred to herein as radio frequency circuitry.

In the example of FIG. 3, the antenna module 397 may include a first antenna 461, a second antenna 462, a third antenna 463, and a fourth antenna 464. The number of the antennas illustrated in FIG. 3 is provided for description, and embodiments of the disclosure are not limited thereto. The first antenna 461 may be connected to a first RFFE 451. The second antenna 462 may be connected to a second RFFE 452. The third antennas 463 may be connected to a third RFFE 453. The fourth antenna 464 may be connected to a fourth RFFE 454. Each of the plurality of RFFEs may include at least one component for processing a signal. For example, each of the plurality of RFFEs may include at least one of an amplifier, a low noise amplifier (LNA), at least one filter, a duplexer, and/or a switch, etc.

The switching circuit 395 may include at least one switch connecting the plurality of antennas of the antenna module 397 to the communication circuit 390. The switching circuit 395 may selectively connect the plurality of RFFEs to a transmitting path and/or receiving path of the communication circuit 390. The electronic device 301 may switch a transmitting path and/or receiving path associated with each antenna using the switching circuit 395. Switching a transmitting path and/or receiving path may be performed by switching a transmitting path or receiving port to which an antenna is connected. Switching a transmitting path or receiving port may include switching a transceiver. For example, the electronic device 301 may switch a transmitting path and/or receiving path to a physically separated transmitting port or receiving port. Although FIG. 3 illustrates the switching circuit 395 as a separate component, embodiments of the disclosure are not limited thereto. For example, the switching circuit 395 may be integrated into the antenna module 397 or the communication circuit 390.

According to an embodiment, the electronic device 301 may switch a receiving path using the switching circuit 395. For example, the electronic device 301 may switch a receiving path based on quality (e.g., reception performance) of a received signal associated with each receiving path. The electronic device 301 may switch a receiving path if a receiving path having reception performance that is equal to or lower than specified reception performance is identified among a plurality of receiving paths. When a minority of the plurality of receiving paths have low reception performance, the electronic device 301 may switch a receiving path of the minority of the plurality of receiving paths having low reception performance. When a majority of the plurality of receiving paths have low reception performance, the electronic device 301 may switch a receiving path of a minority of the plurality of receiving paths having high reception performance. The electronic device 301 may be improved in reception performance by physically separating a receiving path that affects an adjacent receiving path. Furthermore, if the number of receiving paths having reception performance that is less than the specified reception performance is at least a specified number, the electronic device 301 may switch a receiving path having high reception performance. Furthermore, if the number of receiving paths having reception performance that is less than the specified reception performance is less than the specified number, the electronic device 301 may switch a receiving path having low reception performance.

In the disclosure, the term "reception performance" may be referred to, for example, as throughput, signal-to-noise ratio (SNR), error rate, received signal strength (e.g., received signal strength indicator (RSSI)), or the like. If the reception performance corresponds to the throughput, the reception performance that is less than the specified reception performance may represent data throughput that is less than specified data throughput. If the reception performance corresponds to the SNR, the reception performance that is less than the specified reception performance may represent an SNR that is less than a specified SNR. If the reception performance corresponds to the received signal strength, the reception performance that is less than the specified reception performance may represent received signal strength that is less than specified received signal strength. If the reception performance corresponds to the error rate, the reception performance that is less than the specified reception performance may represent an error rate that is at least a specified error rate.

According to an embodiment, the electronic device 301 may switch a transmitting path using the switching circuit 395. For example, the electronic device 301 may switch a transmitting path based on quality (e.g., reception performance) of a received signal associated with each receiving path. The electronic device 301 may switch a transmitting path if a receiving path having reception performance that is equal to or lower than specified reception performance is identified among a plurality of receiving paths. The electronic device 301 may be improved in reception performance by physically separating a transmitting path that affects an adjacent receiving path.

According to an embodiment, the electronic device 301 may switch a transmitting path and receiving path using the switching circuit 395. The electronic device 301 may switch a transmitting path if a receiving path having reception performance that is equal to or lower than specified reception performance is identified among a plurality of receiving paths. If a receiving path having reception performance that is equal to or lower than the specified reception performance is present even after switching a transmitting path, the electronic device 301 may switch a receiving path.

According to an embodiment, the electronic device 301 may switch a transmitting path and/or a receiving path based on a frequency band. For example, a leakage signal of a transmission signal may interfere with and thus affect a receiving path. When a harmonic component or intermodulation (IMD) component of a frequency band used in a transmitting path overlaps with a frequency band used in a receiving path, the reception performance of the receiving path may reduce. The electronic device 301 may switch a transmitting path and/or receiving path when the reception performance associated with a receiving path is predicted to reduce based on a transmission frequency band and a reception frequency band. For example, the memory 330 may store information about a frequency band combination for which a transmitting path and/or receiving path is required to be switched. In the case of performing communication using a frequency band corresponding to the stored frequency band combination, the electronic device 301 may switch a transmitting path and/or receiving path. The number of transmission signals is not limited to one. For example, the electronic device 301 may perform communication based on EN-DC. The electronic device 301 may be configured to transmit a first transmission signal to eNB and a second transmission signal to gNB. In this case, a leakage signal from a plurality of transmission signals may affect a receiving path. The electronic device 301 may switch a transmitting path and/or receiving path based on a combination of a frequency band of a received signal and a frequency band of each of a plurality of transmission signals.

The electronic device 301 may perform the above-described transmitting path and/or receiving path switching operations in combination with each other using the switching circuit 395. For example, the electronic device 301 may switch a transmitting path and/or receiving path based on reception performance and/or a frequency band combination.

The electronic device 301 may identify reception performance associated with each receiving path after switching a transmitting path and/or receiving path. If a receiving path having reception performance that is less than specified reception performance is identified even after switching a transmitting path and/or receiving path, the electronic device 301 may increase a gain of an LNA of an RFFE of a receiving path having low reception performance or may increase driving power of the communication circuit 390 (e.g., transceiver).

Hereinafter, example operations of the electronic device 301 are described below with reference to FIGS. 4 to 10 and may be referenced as examples of the operations of the electronic device 301 described above with reference to FIG. 3.

Figure 4:
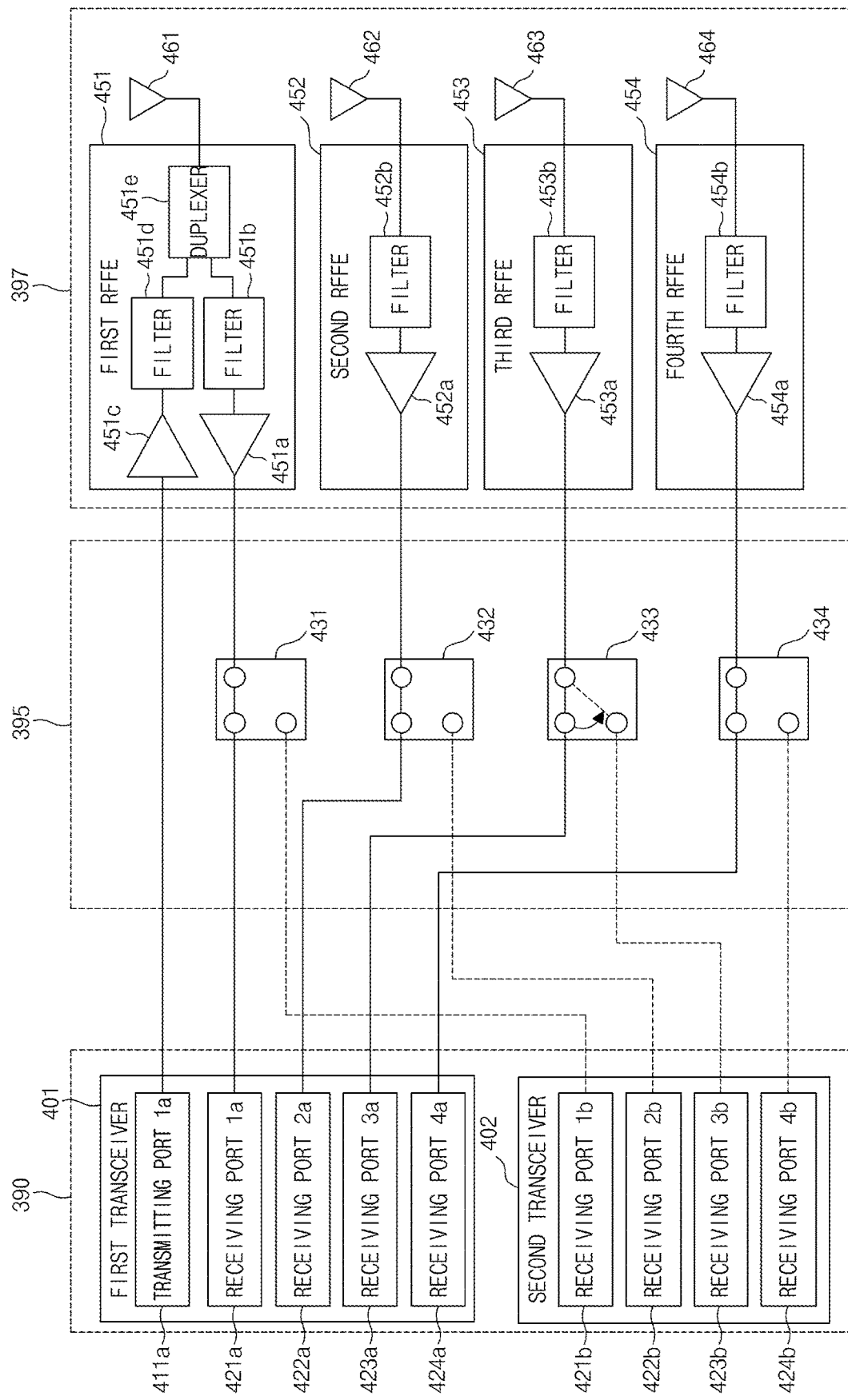
FIG. 4 is a diagram illustrating a first example of switching by an electronic device according to various embodiments.

FIG. 4 is a diagram illustrating a first example of switching by an electronic device according to various embodiments.

In the first example, the communication circuit 390 of the electronic device 301 may include a first transceiver 401 and a second transceiver 402. The first transceiver 401 may include, for example, a transmitting port 1a (411a), a receiving port 2a (422a), a receiving port 3a (423a), and a receiving port 4a (424a). The second transceiver 402 may include, for example, a receiving port 1b (421b), a receiving port 2b (422b), a receiving port 3b (423b), and a receiving port 4b (424b).

The switching circuit 395 may include a first switch 431, a second switch 432, a third switch 433, and a fourth switch 434. The first switch 431, the second switch 432, the third switch 433, and the fourth switch 434 may, for example, be a single pole dual throw (SPDT) switch. The first switch 431 may connect a receiving path associated with the first antenna 461 to the receiving port 1a (421a) or the receiving port 1b (421b). The second switch 432 may connect a receiving path associated with the second antenna 462 to the receiving port 2a (422a) or the receiving port 2b (422b). The third switch 433 may connect a receiving path associated with the third antenna 463 to the receiving port 3a (423a) or the receiving port 3b (423b). The fourth switch 434 may connect a receiving path associated with the fourth antenna 464 to the receiving port 4a (424a) or the receiving port 4b (424b).

The first RFFE 451 may include a transmitting path and receiving path connected to the first antenna 461. An amplifier 451c and a filter 451d may be located in the transmitting path of the first RFFE 451. The transmitting path of the first RFFE 451 may be connected to the transmitting port 1a (411a). An LNA 451a and a filter 451b may be located in the receiving path of the first RFFE 451. The receiving path of the first RFFE 451 may be connected to the receiving port 1a (421a) or the receiving port 1b (421b) through the switching circuit 395. A duplexer 451e may connect the first antenna 461 to the transmitting path or receiving path.

The second RFFE 452 may include a receiving path connected to the second antenna 462. A filter 452b and an LNA 452a may be located in the receiving path of the second RFFE 452. The receiving path of the second RFFE 452 may be connected to the receiving port 2a (422a) or the receiving port 2b (422b) through the switching circuit 395.

The third RFFE 453 may include a receiving path connected to the third antenna 463. A filter 453b and an LNA 453a may be located in the receiving path of the third RFFE 453. The receiving path of the third RFFE 453 may be connected to the receiving port 3a (423a) or the receiving port 3b (423b) through the switching circuit 395.

The fourth RFFE 454 may include a receiving path connected to the fourth antenna 464. A filter 454b and an LNA 454a may be located in the receiving path of the fourth RFFE 454. The receiving path of the fourth RFFE 454 may be connected to the receiving port 4a (424a) or the receiving port 4b (424b) through the switching circuit 395.

In the example of FIG. 4, the electronic device 301 may be configured to transmit/receive data using only the first transceiver 401 in an initial state. In this case, the second transceiver 402 may be in a deactivated state (e.g., low power state or idle state). In an example, the reception performance associated with the receiving port 3a (423a) may be low. Deterioration of the reception performance of the receiving port 3a (423a) may be caused by a leakage signal from adjacent receiving ports. The SNR of a signal received through the receiving port 3a (423a) may decrease due to a leakage signal from the adjacent receiving port 421a, 422a, and/or 424a. In this case, the electronic device 301 may switch the receiving path associated with the third antenna 463 using the third switch 433. For example, the electronic device 301 may connect the third antenna 463 to the receiving port 3b (423b). Since the receiving path associated with the third antenna 463 is physically separated from other receiving paths due to switching of the receiving path, an effect of a leakage signal on the receiving path associated with the third antenna 463 may reduce.

After switching the receiving path associated with the third antenna 463, the electronic device 301 may identify reception performance related to the switched receiving path. If the reception performance is not improved even after switching the receiving path, the electronic device 301 may increase a gain and/or increase driving power. For example, the electronic device 301 may increase an amplification amount of the LNA 453a of the third RFFE 453 having low reception performance. The electronic device 301 may increase driving power of the second transceiver 402 associated with a receiving path having low reception performance.

Although it has been described that the electronic device 301 switches a receiving path having low reception performance with regard to the example of FIG. 4, embodiments of the disclosure are not limited thereto. For example, a specified number (e.g., 3) of receiving paths may have reception performance that is less than specified reception performance. For example, the reception performance associated with the first antenna 461, the second antenna 462, and the fourth antenna 463 may be less than the specified reception performance. In this case, the electronic device 301 may switch the receiving path of the third antenna 463 having reception performance that is at least the specified reception performance. This is because a leakage signal of the receiving path associated with the third antenna 463 may reduce the reception performance of adjacent other receiving paths. For another example, when the reception performances of all of the receiving paths are less than the specified reception performance, the electronic device 301 may not switch a receiving path.

Figure 5:
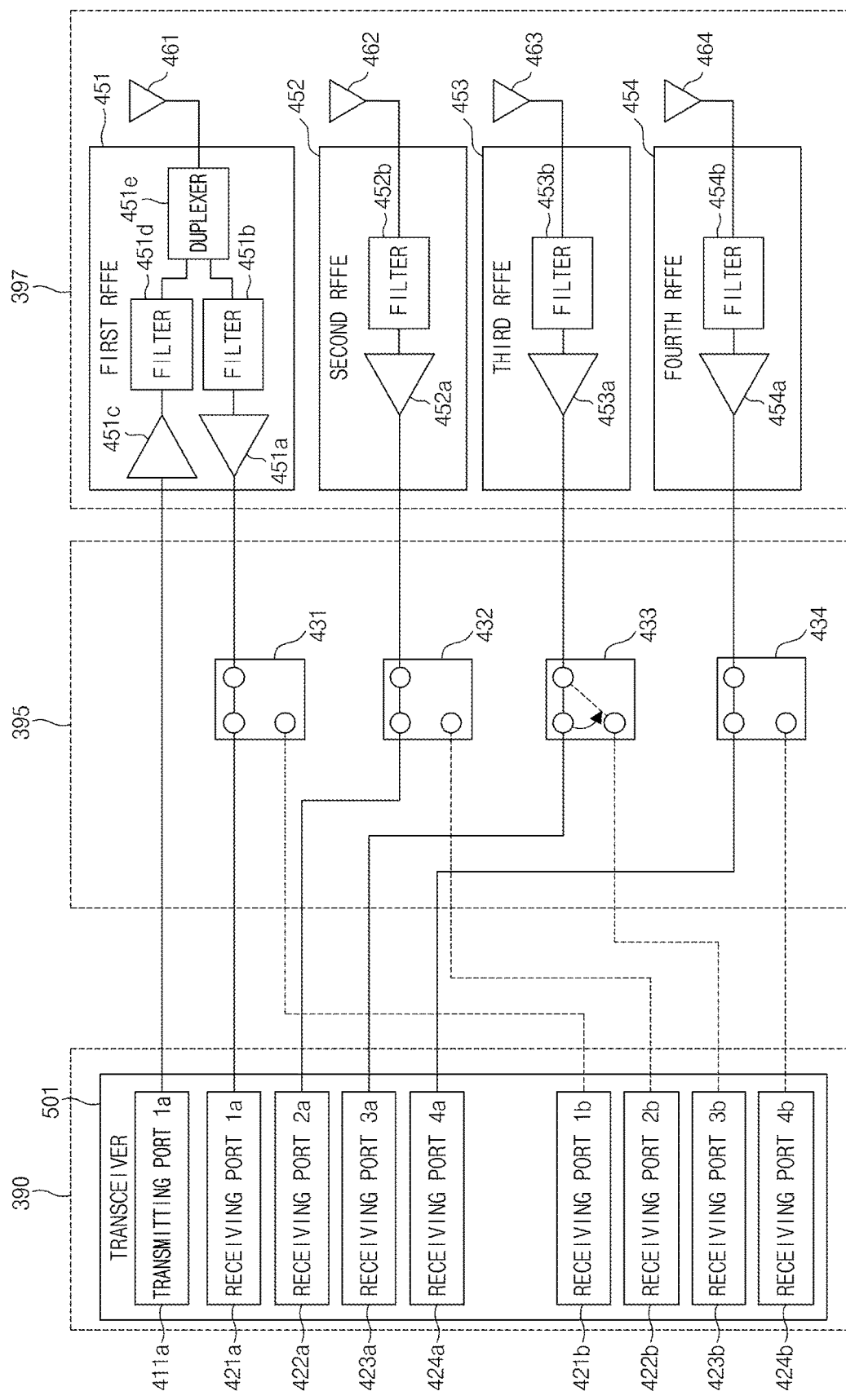
FIG. 5 is a diagram illustrating a second example of switching by an electronic device according to various embodiments.

FIG. 5 is a diagram illustrating a second example of switching by an electronic device according to various embodiments.

The descriptions provided above with reference to FIG. 4 may be referenced for the components of FIG. 5 having the same reference numerals as those of FIG. 4, unless otherwise specified. The communication circuit 390 may include one transceiver 501. The transceiver 501 may include a transmitting port 1a (411a), a receiving port 1a (421a), a receiving port 2a (422a), a receiving port 3a (423a), a receiving port 4a (424a), a receiving port 1b (421b), a receiving port 2b (422b), a receiving port 3b (423b), and a receiving port 4b (424b).

Even in the case of using one transceiver, the electronic device 301 may reduce an effect of a leakage signal by switching a receiving path. In the example of FIG. 5, the electronic device 301 may be configured to transmit/receive data through the transmitting port 1a (411a), the receiving port 1a (421a), the receiving port 2a (422a), the receiving port 3a (423a), and the receiving port 4a (424a) in an initial state. In the electronic device 301, the reception performance associated with the receiving port 3a (423a) may be low. The reception performance associated with the receiving port 3a (423a) may be less than specified reception performance. For example, deterioration of the reception performance of the receiving port 3a (423a) may be caused by a leakage signal from adjacent receiving ports. In this case, the electronic device 301 may switch the receiving path associated with the third antenna 463 using the third switch 433. For example, the electronic device 301 may connect the third antenna 463 to the receiving port 3b (423b). Since the receiving path associated with the third antenna 463 is physically separated from other receiving paths due to switching of the receiving path, an effect of a leakage signal on the receiving path associated with the third antenna 463 may reduce.

After switching the receiving path associated with the third antenna 463, the electronic device 301 may increase an amplification amount or driving power as described above with reference to FIG. 4. As described above with reference to FIG. 4, the electronic device 301 may switch a receiving path based on the number of receiving paths having low reception performance.

Figure 6:
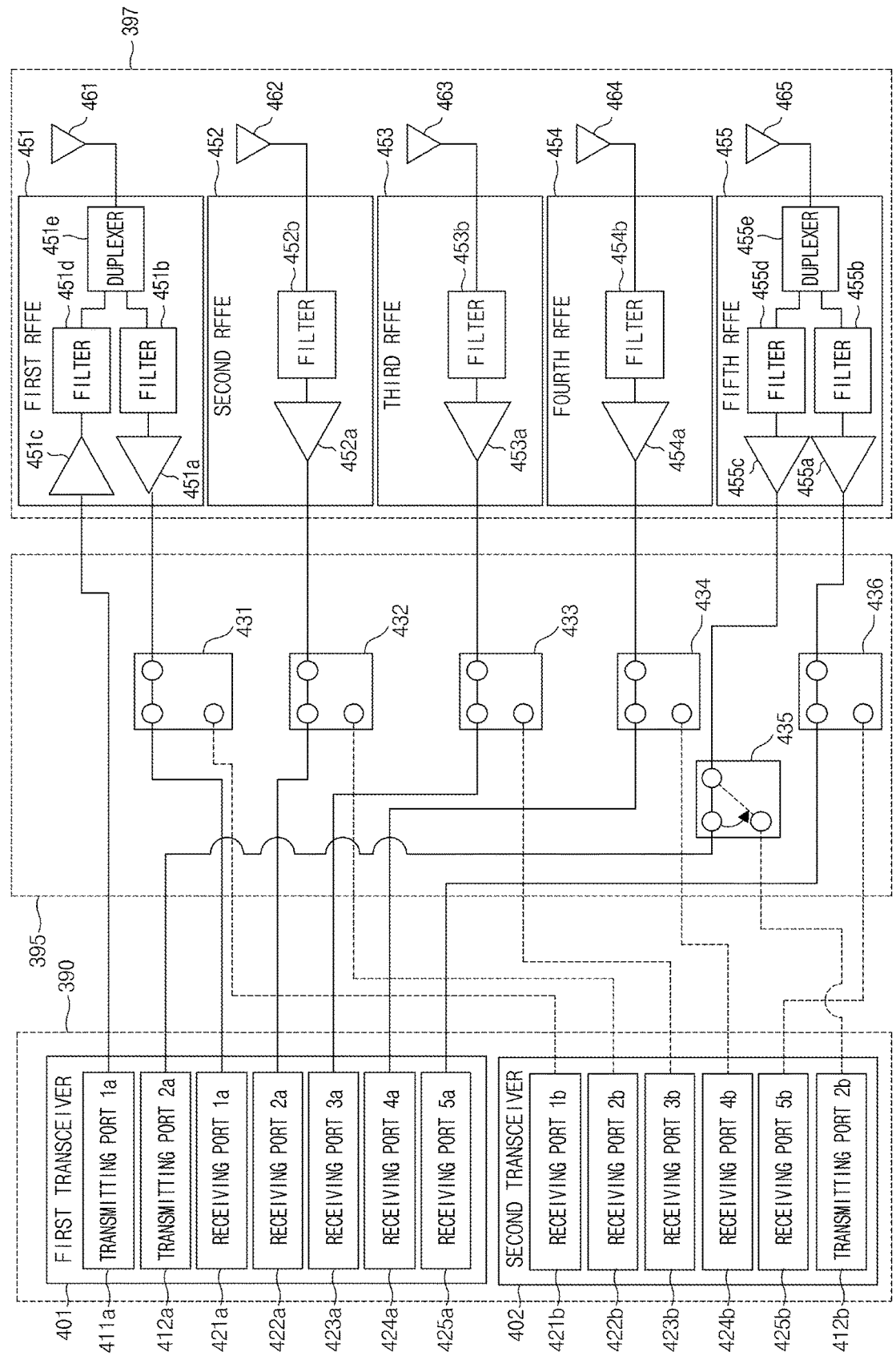
FIG. 6 is a diagram illustrating a third example of switching by an electronic device according to various embodiments.

FIG. 6 is a diagram illustrating a third example of switching by an electronic device according to various embodiments.

The descriptions provided above with reference to FIG. 4 may be referenced for the components of FIG. 6 having the same reference numerals as those of FIG. 4, unless otherwise specified. In the example of FIG. 6, the first transceiver 401 may further include a receiving port 5a (425a) and a transmitting port 2a (412a). The second transceiver 402 may further include a receiving port 5b (425b) and a transmitting port 2b (412b). The antenna module 397 may further include a fifth RFFE 455 and a fifth antenna 465 connected to the fifth RFFE 455.

The fifth RFFE 455 may include a transmitting path and receiving path connected to the fifth antenna 465. An amplifier 455c and a filter 455d may be located in the transmitting path of the fifth RFFE 455. The transmitting path of the fifth RFFE 455 may be connected to the transmitting port 2a (412a) or the transmitting port 2b (412b). An LNA 455a and a filter 455b may be located in the receiving path of the fifth RFFE 455. The receiving path of the fifth RFFE 455 may be connected to the receiving port 5a (425a) or the receiving port 5b (425b) through the switching circuit 395. A duplexer 455e may connect the fifth antenna 465 to the transmitting path or receiving path.

The switching circuit 395 may further include a fifth switch 435 and a sixth switch 436. In the example of FIG. 6, the fifth switch 435 may connect a transmitting path associated with the fifth antenna 465 to the transmitting port 2a (412a) or the transmitting port 2b (412b). The sixth switch 436 may connect a receiving path associated with the fifth antenna 465 to the receiving port 5a (425a) or the receiving port 5b (425b). For example, the fifth switch 435 and the sixth switch 436 may be an SPDT switch.

In the example of FIG. 6, the electronic device 301 may support E-UTRAN new radio dual connectivity (EN-DC). For example, the electronic device 301 may perform communication of EN-DC using the same frequency band such as an LTE B71 band and new radio (NR) n71 band. An RAT associated with the transmitting path of the first RFFE 451 and an RAT associated with the transmitting path of the fifth RFFE 455 may differ from each other.

The electronic device 301 may be configured to transmit/receive data using the first transceiver 401 in an initial state. For example, the transmitting path of the first RFFE 451 may be connected to the transmitting port 1a (411a), and the receiving path of the first RFFE 451 may be connected to the receiving port 1a (421a) through the first switch 431. The receiving path of the second RFFE 452 may be connected to the receiving port 2a (422a) through the second switch 432. The receiving path of the third RFFE 453 may be connected to the receiving port 3a (423a) through the third switch 433. The receiving path of the fourth RFFE 454 may be connected to the receiving port 4a (424a) through the fourth switch 434. The transmitting path of the fifth RFFE 455 may be connected to the transmitting port 2a (412a) through the fifth switch 435, and the receiving path of the fifth RFFE 455 may be connected to the receiving port 5a (425a) through the sixth switch 436.

While communicating using the first transceiver 401, the electronic device 301 may identify that reception performance associated with at least one receiving port is equal to or less than specified reception performance. For example, the reception performance may reduce due to an IMD component between the transmitting paths of the first RFFE 451 and the fifth RFFE 455.

According to an embodiment, the electronic device 301 may switch a transmitting path based on reduction of the reception performance associated with a receiving path. In the example of FIG. 6, the electronic device 301 may connect the transmitting path of the fifth RFFE 455 to the transmitting port 2b (412b) of the second transceiver 402 using the fifth switch 435. In this case, the IMD component may be prevented and/or reduced since the transmitting path of the first RFFE 451 and the transmitting path of the fifth RFFE 455 are physically separated from each other. After switching the transmitting path, the electronic device 301 may identify the reception performance associated with each receiving path. If a receiving path having reception performance that is less than the specified reception performance is present even after switching the transmitting path, the electronic device 301 may switch at least one receiving path. For example, the electronic device 301 may switch a receiving path as described above with reference to FIG. 4. After switching the receiving path, an amplification amount of an LNA or driving power of a transceiver may be increased as described above with reference to FIG. 4.

According to an embodiment, the electronic device 301 may switch a transmitting path based on reduction of the reception performance associated with a receiving path and an operation mode. For example, the electronic device 301 may not switch a transmitting path when an operation mode of the electronic device 301 is a power saving mode. Power consumption of the electronic device 301 may be reduced by maintaining the second transceiver 402 in a deactivated state (e.g., idle state). The power saving mode may be set by a user of the electronic device 301. The electronic device 301 may operate in the power saving mode when a charging state of a battery of the electronic device 301 is less than a specified value. The electronic device 301 may switch a transmitting path and/or a receiving path as described above when the electronic device 301 is not in the power saving mode.

Figure 7:
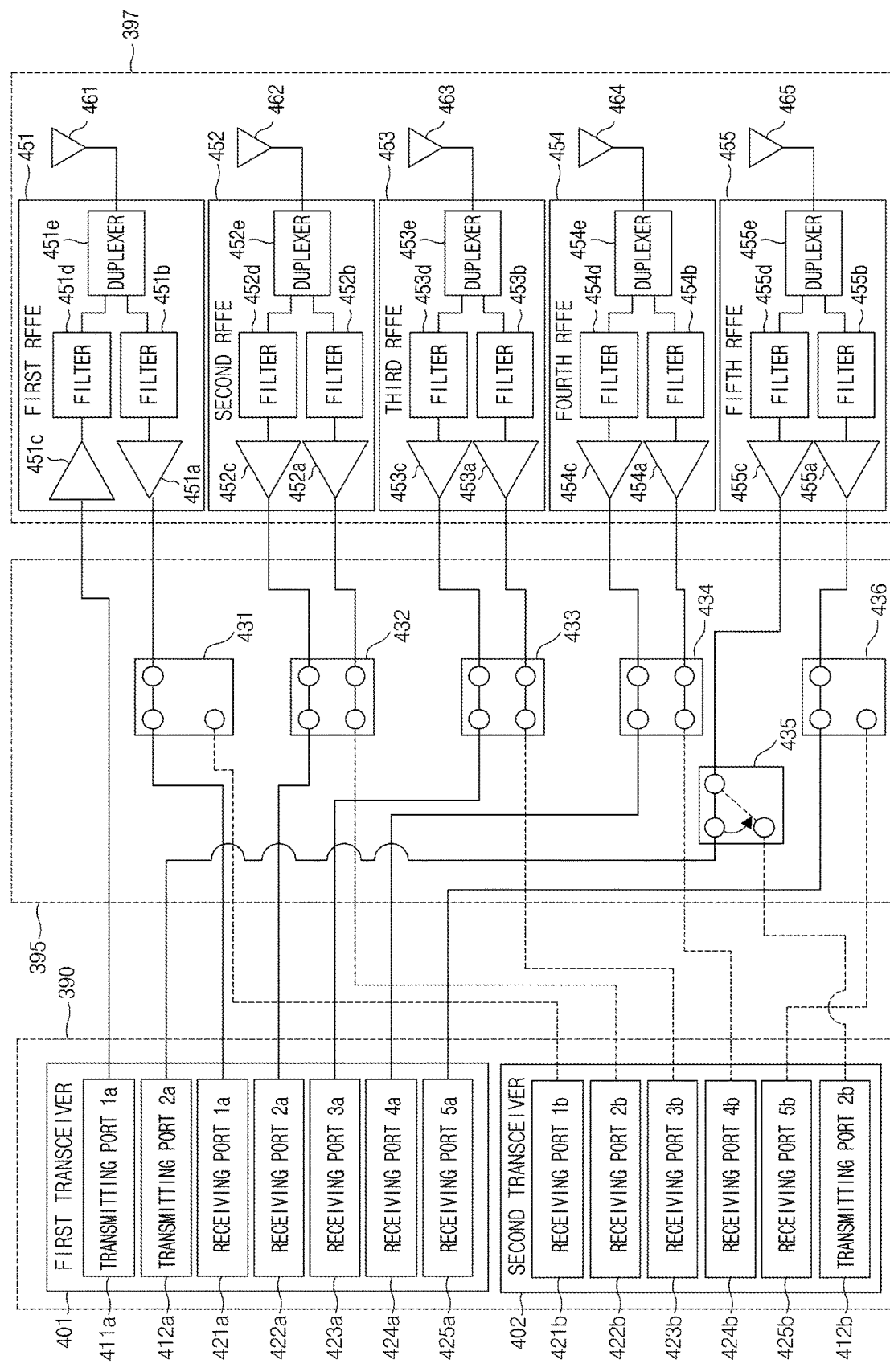
FIG. 7 is a diagram illustrating a fourth example of switching by an electronic device according to various embodiments.

FIG. 7 is a diagram illustrating a fourth example of switching by an electronic device according to various embodiments.

The descriptions provided above with reference to FIGS. 4 and 6 may be referenced for the components of FIG. 7 having the same reference numerals as those of FIGS. 4 and 6, unless otherwise specified.

In the example of FIG. 7, the second RFFE 452 may include a receiving path including an LNA 452c and a filter 452d and a receiving path including an LNA 452a and a filter 452b. A duplexer 452e may selectively connect the two receiving paths to the second antenna 462. The second switch 432 may connect the LNA 452a to the receiving port 2a (422a) or the receiving port 2b (422b). The second switch 432 may connect the LNA 452c to the receiving port 2a (422a) or the receiving port 2b (422b). The second switch 432 may be a dual pole dual throw (DPDT) switch. The filter 452b and the filter 452d may be configured to pass signals of different bands.

The third RFFE 453 may include a receiving path including an LNA 453c and a filter 453d and a receiving path including an LNA 453a and a filter 453b. A duplexer 453e may selectively connect the two receiving paths to the third antenna 463. The third switch 433 may connect the LNA 453a to the receiving port 3a (423a) or the receiving port 3b (423b). The third switch 433 may connect the LNA 453c to the receiving port 3a (423a) or the receiving port 3b (423b). The third switch 433 may be a DPDT switch. The filter 453b and the filter 453d may be configured to pass signals of different bands.

The fourth RFFE 454 may include a receiving path including an LNA 454c and a filter 454d and a receiving path including an LNA 454a and a filter 454b. A duplexer 454e may selectively connect the two receiving paths to the fourth antenna 464. The fourth switch 434 may connect the LNA 454a to the receiving port 4a (424a) or the receiving port 4b (424b). The fourth switch 434 may connect the LNA 454c to the receiving port 4a (424a) or the receiving port 4b (424b). The fourth switch 434 may be a DPDT switch. The filter 454b and the filter 454d may be configured to pass signals of different bands.

In the example of FIG. 7, the electronic device 301 may support E-UTRAN new radio dual connectivity (EN-DC). For example, the electronic device 301 may perform communication of EN-DC using different frequency bands such as an LTE B3 band and NR n78 band. An RAT associated with the transmitting path of the first RFFE 451 and an RAT associated with the transmitting path of the fifth RFFE 455 may differ from each other.

As described above with reference to FIG. 6, the electronic device 301 may be configured to transmit/receive data using the first transceiver 401 in an initial state. While communicating using the first transceiver 401, the electronic device 301 may identify that reception performance associated with at least one receiving port is equal to or less than specified reception performance. For example, the reception performance may reduce due to an IMD component between the transmitting paths of the first RFFE 451 and the fifth RFFE 455. For example, a harmonic component of a signal of the LTE B3 band may act as interference on a received signal of the NR n78 band. Due to the IMD component and harmonic component, the reception performance of a receiving path may reduce.

According to an embodiment, the electronic device 301 may switch a transmitting path based on reduction of the reception performance associated with a receiving path. In the example of FIG. 7, the electronic device 301 may connect the transmitting path of the fifth RFFE 455 to the transmitting port 2b (412b) of the second transceiver 402 using the fifth switch 435. In this case, the IMD component may be prevented and/or reduced since the transmitting path of the first RFFE 451 and the transmitting path of the fifth RFFE 455 are physically separated from each other. After switching the transmitting path, the electronic device 301 may switch a receiving path as described above with reference to FIG. 6. As described above with reference to FIG. 6, the electronic device 301 may switch a receiving path based on reduction of the reception performance associated with a receiving path and the operation mode.

Figure 8:
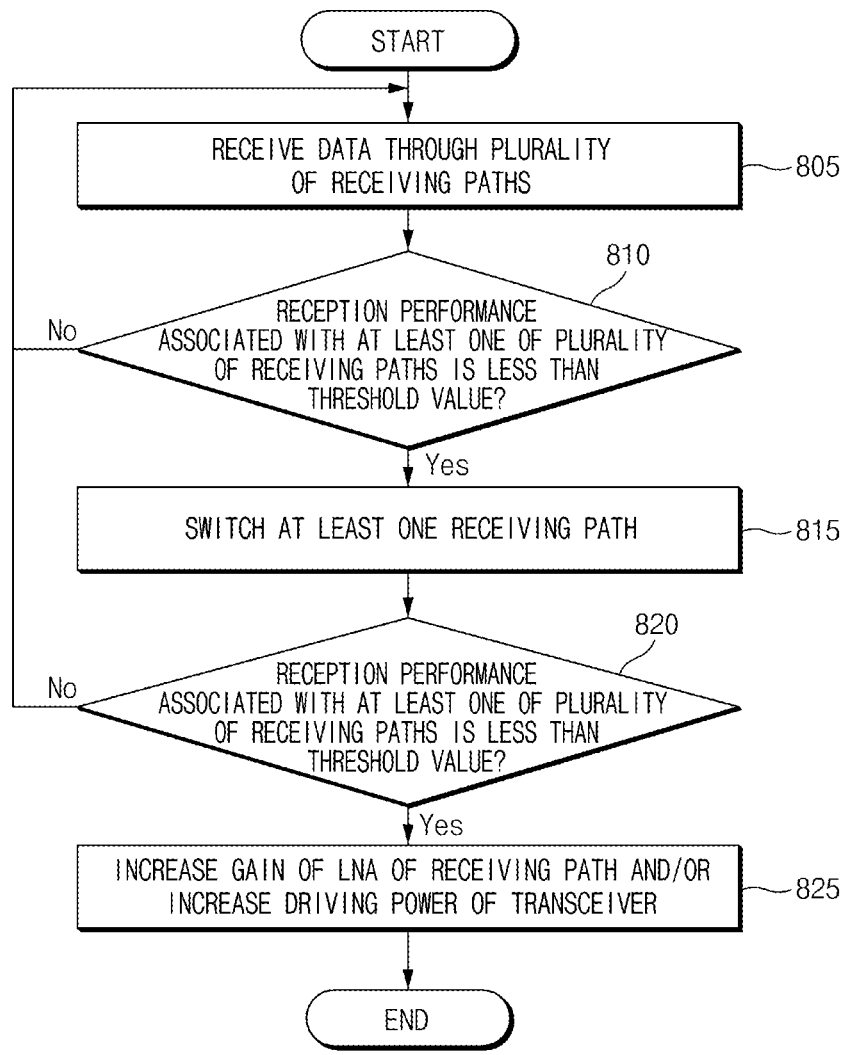
FIG. 8 is a flowchart illustrating an example data receiving method of an electronic device according to various embodiments.

FIG. 8 is a flowchart illustrating an example data receiving method of an electronic device according to various embodiments.

Referring to FIGS. 3 and 8, in operation 805, the electronic device 301 may receive data through a plurality of receiving paths. For example, the electronic device 301 may receive multiple data streams from at least one base station through the plurality of receiving paths associated with a plurality of antennas.

In operation 810, the electronic device 301 may determine whether reception performance associated with at least one of the plurality of receiving paths is less than a threshold value. The electronic device 301 may identify reception performance received signals using a plurality of receiving ports respectively connected to the plurality of receiving paths, and may compare the identified reception performance and the threshold value. The reception performance is an example, and embodiments of the disclosure are not limited thereto. For example, the electronic device 301 may identify a receiving path having low reception performance based on an error rate (e.g., BLER). When the reception performances of all of the receiving paths are at least the threshold value (e.g., operation 810-NO), the electronic device 301 may continue to receive data through the plurality of receiving paths.

When the reception performance of at least one receiving path is less than the threshold value (e.g., operation 810—YES), the electronic device 301 may switch a receiving path of the at least one receiving path in operation 815. For example, the electronic device 301 may switch a receiving port within one transceiver or may connect a receiving port to another transceiver. The electronic device 301 may switch a receiving path by switching a receiving port of the communication circuit 390 to which an RFFE is connected, using the switching circuit 395. A receiving path switching method will be described in greater detail below with reference to FIG. 9.

In operation 820, the electronic device 301 may identify whether the reception performance associated with at least one of the plurality of receiving paths is less than the threshold value. For example, after switching a receiving path, the electronic device 301 may identify whether the reception performance is less than the threshold value in a manner similar to operation 810. When the reception performances of all of the receiving paths are at least the threshold value (e.g., operation 820-NO), the electronic device 301 may continue to receive data through the plurality of receiving paths.

When the reception performance of at least one receiving path is less than the threshold value (e.g., operation 820—

YES), the electronic device 301 may increase a gain of an LNA of a receiving path and/or increase driving power of a transceiver in operation 825.

Figure 9:
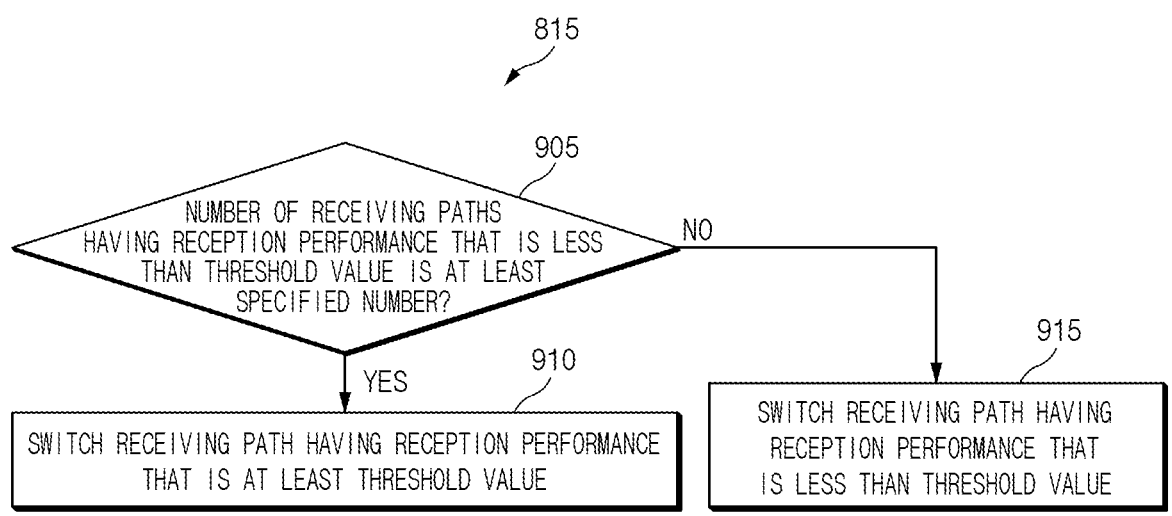
FIG. 9 is a flowchart illustrating an example switching method of an electronic device according to various embodiments.

FIG. 9 is a flowchart illustrating an example switching method of an electronic device according to various embodiments.

The operations of FIG. 9 may correspond to operation 815 of FIG. 8. In operation 905, the electronic device 301 may identify whether the number of receiving paths having reception performance that is less than a threshold value is at least a specified number. For example, in the case where the electronic device 301 supports MIMO, the specified number may be 3.

When the number of receiving paths having reception performance that is less than the threshold value is at least the specified number (e.g., operation 905—YES), the electronic device 301 may switch a receiving path having reception performance that is at least the threshold value in operation 910. For example, when three receiving paths among four receiving paths have reception performance that is less than the threshold value, the electronic device 301 may switch the other receiving path having reception performance that is at least the threshold value. When all of the receiving paths have reception performance that is less than the threshold value, the electronic device 301 may not switch a receiving path.

When the number of receiving paths having reception performance that is less than the threshold value is less than the specified number (e.g., operation 905-NO), the electronic device 301 may switch a receiving path having reception performance that is less than the threshold value in operation 915. For example, when one or two receiving paths among four receiving paths have reception performance that is less than the threshold value, the electronic device 301 may switch the one or two receiving path having reception performance that is less than the threshold value.

Figure 10:
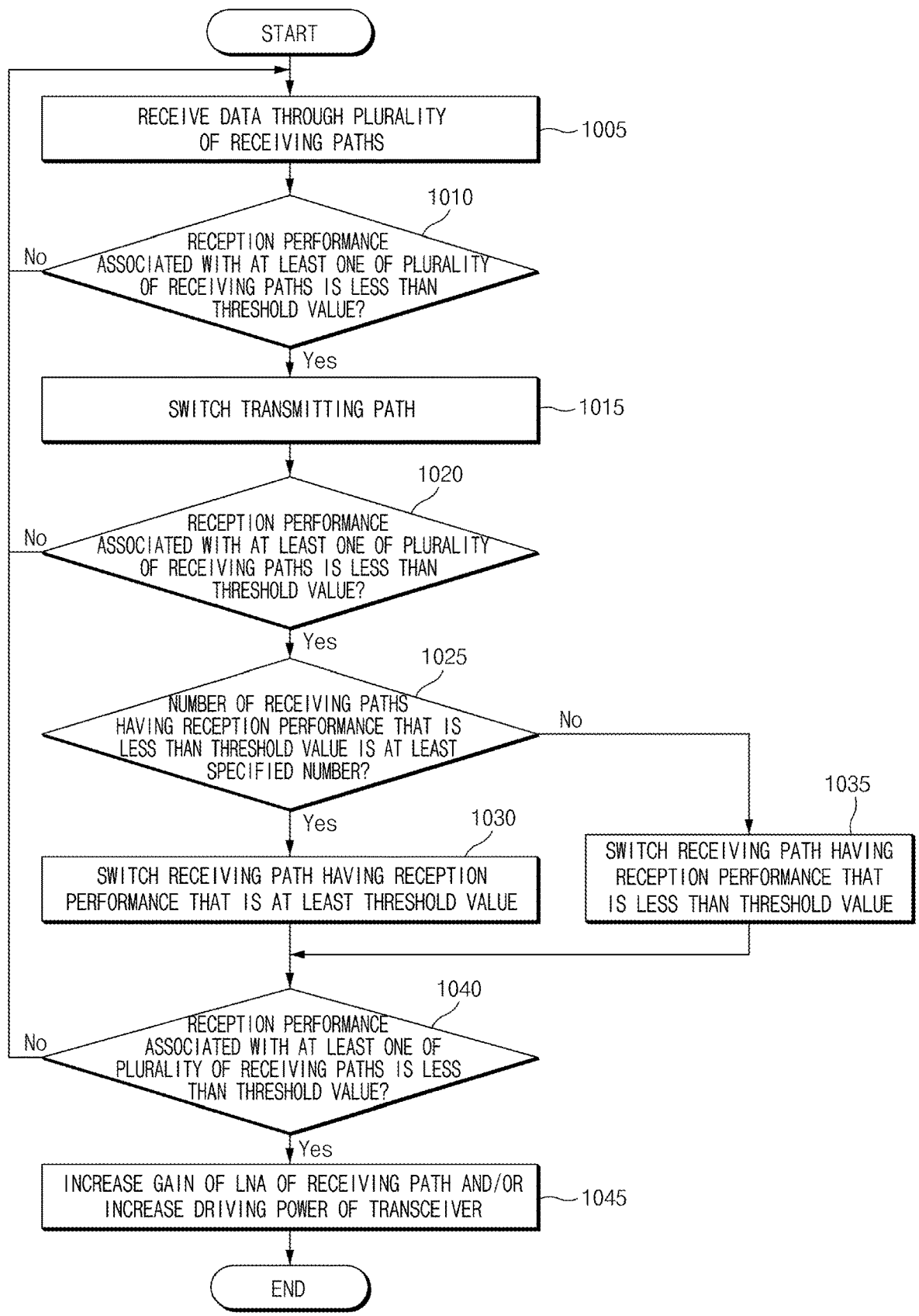
FIG. 10 is a flowchart illustrating an example data receiving method of an electronic device according to various embodiments.

FIG. 10 is a flowchart illustrating an example data receiving method of an electronic device according to various embodiments.

Referring to FIGS. 3 and 10, in operation 1005, the electronic device 301 may receive data through a plurality of receiving paths. For example, the electronic device 301 may receive multiple data streams from at least one base station through the plurality of receiving paths associated with a plurality of antennas.

In operation 1010, the electronic device 301 may determine whether reception performance associated with at least one of the plurality of receiving paths is less than a threshold value. The electronic device 301 may identify reception performance received using a plurality of receiving ports respectively connected to the plurality of receiving paths, and may compare the identified reception performance and the threshold value. For example, the electronic device 301 may perform operation 1010 by performing operation 810 of FIG. 8. When the reception performances of all of the receiving paths are at least the threshold value (e.g., operation 1010-NO), the electronic device 301 may continue to receive data through the plurality of receiving paths.

When the reception performance of at least one receiving path is less than the threshold value (e.g., operation 1010—YES), the electronic device 301 may switch a transmitting path in operation 1015. For example, the electronic device 301 may switch a transmitting path by connecting the transmitting path to a transmitting port of another transceiver. The electronic device 301 may switch a transmitting path by switching a transmitting port of the communication circuit 390 to which an RFFE is connected, using the switching circuit 395.

In operation 1020, the electronic device 301 may identify whether the reception performance associated with at least one of the plurality of receiving paths is less than the threshold value. For example, the electronic device 301 may perform operation 1020 in the same manner as operation 1010. When the reception performances of all of the receiving paths are at least the threshold value (e.g., operation 1020-NO), the electronic device 301 may continue to receive data through the plurality of receiving paths.

When the reception performance of at least one receiving path is less than the threshold value (e.g., operation 1020—YES), the electronic device 301 may identify whether the number of receiving paths having reception performance that is less than the threshold value is at least a specified number in operation 1025. For example, in the case where the electronic device 301 supports MIMO, the specified number may be 3.

When the number of receiving paths having reception performance that is less than the threshold value is at least the specified number (e.g., operation 1025—YES), the electronic device 301 may switch a receiving path having reception performance that is at least the threshold value in operation 1030. For example, when three receiving paths among four receiving paths have reception performance that is less than the threshold value, the electronic device 301 may switch the other receiving path having reception performance that is at least the threshold value. When all of the receiving paths have reception performance that is less than the threshold value, the electronic device 301 may not switch a receiving path.

When the number of receiving paths having reception performance that is less than the threshold value is less than the specified number (e.g., operation 1025-NO), the electronic device 301 may switch a receiving path having reception performance that is less than the threshold value in operation 1035. For example, when one or two receiving paths among four receiving paths have reception performance that is less than the threshold value, the electronic device 301 may switch the one or two receiving path having reception performance that is less than the threshold value.

After switching a receiving path, the electronic device 301 may identify whether the reception performance associated with at least one of the plurality of receiving paths is less than the threshold value in operation 1040. For example, after switching a receiving path, the electronic device 301 may identify whether the reception performance is less than the threshold value in a manner similar to operation 1010. When the reception performances of all of the receiving paths are at least the threshold value (e.g., operation 1040-NO), the electronic device 301 may continue to receive data through the plurality of receiving paths.

When the reception performance of at least one receiving path is less than the threshold value (e.g., operation 1040—YES), the electronic device 301 may increase a gain of an LNA of a receiving path and/or increase driving power of a transceiver in operation 1045.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a plurality of antennas;
a plurality of radio frequency circuits respectively connected to the plurality of antennas;
a first transceiver;
a second transceiver;
a switching circuit configured to connect the plurality of radio frequency circuits to the first transceiver and/or the second transceiver;
a processor; and
a memory,
wherein the memory stores instructions that, when executed by the processor, cause the electronic device to:
form at least one transmitting path and a plurality of first receiving paths by connecting the plurality of radio frequency circuits to the first transceiver using the switching circuit;
receive data through the plurality of first receiving paths; and
switch at least one of the plurality of first receiving paths by connecting at least one of the plurality of radio frequency circuits to the second transceiver using the switching circuit based on reception performance associated with the plurality of first receiving paths.

2. The electronic device of claim 1, wherein the instructions, when executed by the processor, cause the electronic device to:
identify at least one first receiving path having the reception performance less than specified reception performance among the plurality of first receiving paths; and
switch at least one of the plurality of first receiving paths based on the number of the at least one first receiving path.

3. The electronic device of claim 2, wherein the instructions, when executed by the processor, cause the electronic device to: connect, based on the number of the at least one first receiving path being at least a specified number, a first receiving path having the reception performance that is at least the specified reception performance among the plurality of first receiving paths to the second transceiver.

4. The electronic device of claim 2, wherein the instructions, when executed by the processor, cause the electronic device to: connect, based on the number of the at least one first receiving path being less than a specified number, the at least one first receiving path having the reception performance that is less than the specified reception performance among the plurality of first receiving paths to the second transceiver.

5. The electronic device of claim 2, wherein the instructions, when executed by the processor, cause the electronic device to:
identify the reception performance associated with the plurality of first receiving paths after switching at least one of the plurality of first receiving paths; and
increase, based on the at least one first receiving path having the reception performance that is less than the specified reception performance being present among the plurality of first receiving paths, an amplification amount of a low noise amplifier (LNA) of a radio frequency circuit connected to the at least one receiving path having the reception performance that is less than the specified reception performance.

6. The electronic device of claim 1,
wherein the instructions, when executed by the processor, cause the electronic device to: connect a second transmitting path to the second transceiver using the switching circuit based on the reception performance associated with at least one of the plurality of first receiving paths being less than a specified reception performance,
wherein the at least one transmitting path comprises a first transmitting path and the second transmitting path.

7. The electronic device of claim 6, wherein the instructions, when executed by the processor, cause the electronic device to: switch at least one of the plurality of receiving paths based on the at least one first receiving path having the reception performance that is less than the specified reception performance being present among the plurality of first receiving paths after connecting the second transmitting path to the second transceiver.

8. The electronic device of claim 1,
wherein the instructions, when executed by the processor, cause the electronic device to: switch at least one of the plurality of first receiving paths by connecting at least one of the plurality of radio frequency circuits to the second transceiver using the switching circuit further based on the reception performance associated with the plurality of first receiving paths and an operation mode of the electronic device,
wherein the operation mode comprises a power saving mode.

9. The electronic device of claim 8,
wherein the instructions, when executed by the processor, cause the electronic device to:
maintain the plurality of first receiving paths and maintain the second transceiver in a deactivated state based on the operation mode of the electronic device being the power saving mode; and
switch at least one of the plurality of first receiving paths by connecting at least one of the plurality of radio frequency circuits to the second transceiver using the switching circuit based on the reception performance associated with the plurality of first receiving paths based on the operation mode of the electronic device not being the power saving mode.

10. The electronic device of claim 1, wherein the reception performance comprises at least one of throughput, received signal strength, or signal-to-noise ratio (SNR).

11. A method for receiving data by an electronic device comprising a plurality of antennas, the method comprising:
forming at least one transmitting path and a plurality of first receiving paths by connecting a plurality of radio frequency circuits respectively connected to the plurality of antennas to a first transceiver of the electronic device;
receiving data through the plurality of first receiving paths; and
switching at least one of the plurality of first receiving paths by connecting at least one of the plurality of radio frequency circuits to a second transceiver of the electronic device based on reception performance associated with the plurality of first receiving paths.

12. The method of claim 11, wherein the switching of at least one of the plurality of first receiving paths comprises:
identifying at least one first receiving path having the reception performance that is less than specified reception performance among the plurality of first receiving paths; and switching at least one of the plurality of first receiving paths based on the number of the at least one first receiving path.

13. The method of claim 12, wherein the switching of at least one of the plurality of first receiving paths based on the number of the at least one first receiving path comprises connecting, based on the number of the at least one first receiving path being at least a specified number, a first receiving path having the reception performance that is at least the specified reception performance among the plurality of first receiving paths to the second transceiver.

14. The method of claim 12, wherein the switching of at least one of the plurality of first receiving paths based on the number of the at least one first receiving path comprises connecting, based on the number of the at least one first receiving path being less than a specified number, the at least one first receiving path having the reception performance that is less than the specified reception performance among the plurality of first receiving paths to the second transceiver.

15. The method of claim 12, further comprising:
identifying the reception performance associated with the plurality of first receiving paths after switching at least one of the plurality of first receiving paths; and
increasing, based on the at least one first receiving path having the reception performance that is less than the specified reception performance being present among the plurality of first receiving paths, an amplification amount of a low noise amplifier (LNA) of a radio frequency circuitry connected to the at least one receiving path having the reception performance that is less than the specified reception performance.

16. The method of claim 11, further comprising connecting a second transmitting path among a first transmitting path and the second transmitting path of the at least one transmitting path to the second transceiver based on the reception performance associated with at least one of the plurality of first receiving paths being less than specified reception performance.

17. The method of claim 16, wherein the switching of at least one of the plurality of first receiving paths comprises switching at least one of the plurality of receiving paths based on the at least one first receiving path having the reception performance that is less than the specified reception performance being present among the plurality of first receiving paths after connecting the second transmitting path to the second transceiver.

18. The method of claim 11, wherein the switching of at least one of the plurality of first receiving paths comprises:
switching at least one of the plurality of first receiving paths by connecting at least one of the plurality of radio frequency circuits to the second transceiver further based on the reception performance associated with the plurality of first receiving paths and an operation mode of the electronic device,
wherein the operation mode comprises a power saving mode.

19. The method of claim 18, wherein the switching of at least one of the plurality of first receiving paths by connecting at least one of the plurality of radio frequency circuits to the second transceiver further based on the reception performance associated with the plurality of first receiving paths and the operation mode of the electronic device comprises:
maintaining the plurality of first receiving paths and maintaining the second transceiver in a deactivated state based on the operation mode of the electronic device being the power saving mode; and
switching at least one of the plurality of first receiving paths by connecting at least one of the plurality of radio frequency circuits to the second transceiver based on the reception performance associated with the plurality of first receiving paths based on the operation mode of the electronic device not being the power saving mode.

20. The method of claim 11, wherein the reception performance comprises at least one of throughput, received signal strength, or signal-to-noise ratio (SNR).

* * * * *